March 18, 1958 A. KRAUSE ET AL 2,827,022

RADIANT TUBULAR BOILER

Filed March 16, 1955

INVENTORS:
ARTUR KRAUSE
FRANZ NOWAK
BY
ATTORNEY 2,827,022
Patented Mar. 18, 1958

2,827,022
RADIANT TUBULAR BOILER

Artur Krause, Mulheim Ruhr, and Franz Nowak, Waiblingen, Germany, assignors to Kohlenscheidungs-Gesellschaft m. b. H., a corporation of West Germany Application March 16, 1955, Serial No. 494,702

8 Claims. (Cl. 122—235)

This invention relates to a radiant steam generator of a thermal power plant being fired with ash forming fuel and discharging the ash in a fluid state. The invention is particularly concerned with a steam generator in which finely divided fuel such as pulverized coal and air is blown into the furnace tangentially to one or more imaginary firing circles positioned within the furnace chamber.

A power plant of this type generally comprises a combustion chamber provided with a central gas outlet, similar to that of a cyclone separator, through which the furnace gases escape and pass into a second chamber, the so-called radiant furnace chamber. In this radiant furnace chamber the temperature of the combustion gases is cooled below the fusion point of the ash. The ashes carried in the combustion gases therefore solidify and have a lesser tendency to adhere to the convection heating surfaces located in the upper portion of the radiant furnace chamber or in gas passages beyond.

In furnaces of the above type most of the ash is removed from the gases within the cyclonic combustion chamber by centrifugal force and in a molten state. This is accomplished by maintaining the temperature of the gases while passing through the combustion chamber considerably above the fusion point of the ash. The separation of the ashes in fluid form has the additional advantage of encouraging the forming of ash conglomerations which by virtue of a larger mass are easily separated from the gases by centrifugal force and are thrown against the walls of the combustion chamber. The molten ash runs down these walls and flows out through an opening in the combustion chamber floor.

It has been found in the operation of furnaces of this type that the ash thrown out of the gases near the mouth of the axial gas outlet, instead of flowing downwardly by gravity, is pulled upwardly through the outlet throat of the chamber by the high velocity of the rotating gas stream. By gradually creeping upwardly into the lower portion of the radiant chamber these molten ashes reach a region where the temperature drops to a point below the fusion point, causing the ashes to solidify, adhere to and build up on the lower walls of the radiant furnace chamber. These accumulated ash deposits by reducing the heat transfer efficiency of the wall surfaces interfere with the proper operation of the unit. This of course makes it necessary to periodically shut down the unit for cleaning purposes, a costly and time consuming operation.

In accordance with the invention a considerable improvement of this condition can be achieved by providing the gas outlet throat of the cyclonic combustion chamber with radially extending tubular wall surfaces. These walls change the direction of the rotating gases and cause them to approach a flow path which is in an upwardly longitudinal direction. The wet ash particles are accordingly carried upwardly into a higher and cooler portion of the radiant furnace chamber where these particles solidify without coming in contact with the chamber walls. These solid ash particles then will be carried out of the furnace by the gases without slagging up the convection heating surfaces or forming deposits on the lower portion of the radiant furnace chamber walls.

It is accordingly a primary object of the invention to burn ash forming fuels in a cyclone furnace without causing excessive ash deposits to form adjacent the gas discharge end of the cyclone chamber.

Another important object of the invention is to provide guiding vanes or radially extending walls inside the axial gas discharge duct of the cyclone chamber to change the flow direction of the rotating gases and to discharge these gases into the radiant chamber in a generally longitudinally axial direction.

Other and further objects of the invention will become apparent to those skilled in the art from the detailed description thereof when taken in conjunction with the accompanying drawings wherein.

Figure 1:
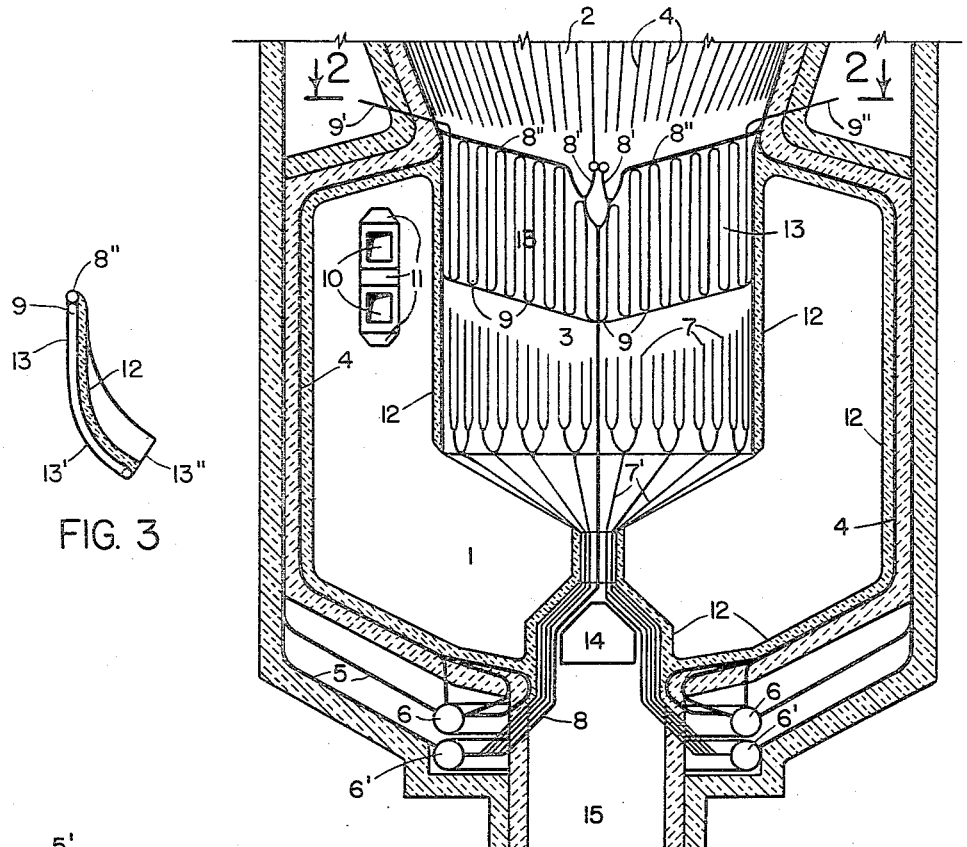
Figure 1 is an enlarged longitudinal sectional view of the cyclone furnace chamber including an adjoining portion of the radiant chamber.
Figures 1A, 2:
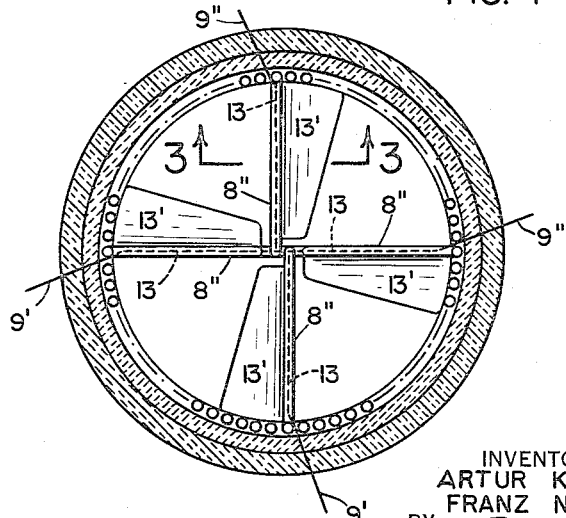
Figure 1A is a diagrammatic representation of a steam generator having a cyclone furnace equipped with our inventive improvement.
Figure 2 is a horizontal cross section above the gas outlet duct of the cyclone chamber taken on line 2—2 and showing the radially extending guide walls.

The steam generator illustrated in Figs. 1A and 1 is of the natural circulation type and comprises a circular combustion and slagging chamber 1 which communicates with a radiant chamber 2 by way of a gas outlet duct 3 also of circular cross section. Combustion chamber 1 is lined with water cooled tubes 4 rising from ring header 6.

This header 6 receives water by way of downcomers 5. Duct 3 is lined with water cooled tubes 7 which are connected to ring header 6' by means of tubes 7'. Water cooled tubes 4 form a constriction in the roof of chamber 1 before continuing upwardly together with cooling tubes 7 to form the lining for radiant chamber 2.

Figure 3:
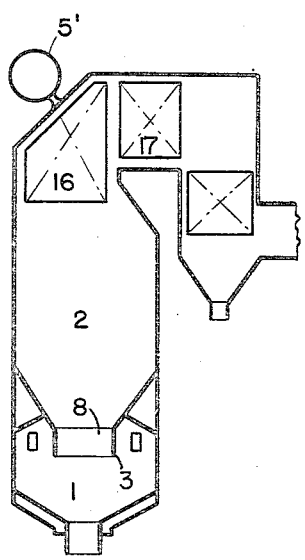
Fig. 3 is a detail of a guide wall having a curved streamlined form.

Headers 6 and 6' are connected to a feed water source such as drum 5' by way of downcomer tubes 5. Tube 8 originating in ring header 6' passes upwardly in an axial direction through the centre of outlet duct 3 and branches off into four radial arms 8" by means of bifurcates 8'. These arms extend from the center of duct 3 towards the circumference thereof and form the upper trailing edge of radial walls 13. Tubes 8" after reaching the wall of duct 3 continue on upwardly to form part of the lining of radiant chamber 2. Tubes 8" also serve as hangers for sinuously bent tubes 9. Water is fed to these tubes 9 through feed tubes 9' and water and steam is discharged therefrom through tubes 9" which are connected to drum 5' by means not shown. Refractory material 12 may be attached to tubes 9 (see Fig. 3) to form solid walls, or these tubes may be closely spaced in tangent relation. Also tubes 4 and tubes 7 may be lined with refractory 12 as indicated in Fig. 1 or these tubes may be left bare.

Fuel, for example pulverized coal, and comubstion air are introduced into the slagging chamber 1 by way of burner openings 10 and 11 respectively in a direction tangential to an imaginary firing circle. The generated combustion gases flow in a spiral path generally in a downward direction, enter the mouth of gas duct 3 and flow upwardly through duct 3 into radiant chamber 2. In the preferred embodiment shown in Fig. 3 directional walls or vanes 13 are provided having a flow conforming curvature in their lower portion 13' and leading edge 13".

The rotation of the gases, accordingly, is gradually converted into an axial motion with a minimum of draft loss so that these gases leave the upper end of duct 3 in a direction generally parallel to the axis of radiant chamber 2.

Because of the high temperature of the combustion gases whirling about within the furnace chamber the ash is thrown in a molten state against the walls 4 of that chamber, flows down these walls and across the bottom thereof and passes through opening 14 into slag duct 15 from where the ashes are removed in a manner well known in the art.

In accordance with the invention any ash particles which still remain in the gases that leave through the gas outlet 3 are carried in a substantially straight upward flow path into the upper portion of radiant chamber 2. In this portion a temperature prevails which is below the ash fusion point of the fuel. Consequently these ash particles are cooled sufficiently so that they solidify before touching the walls of radiant chamber 2 or convection heating surfaces 16 and 17 located in the upper part of the furnace and in the gas passage beyond. Accumulations of slag on these surfaces are therefore avoided, thereby eliminating frequent costly shutdown of the power plant for cleaning purposes.

Although in the illustrative embodiment of the invention a natural circulation steam generator has been described it is understood that the invention can equally well be applied to a forced circulation or controlled circulation steam generator with comparative beneficial results. Furthermore the invention can also be applied to a heat exchanger heating air or other gases instead of steam and a heat exchanger in which ash forming fuels other than pulverized coal are burned.

Finally the invention can be applied also with great advantage to a furnace in which firing takes place under a static pressure higher than atmospheric pressure.

We claim:

1. In a slagging cyclone furnace chamber having an annular combustion space surrounding an axial gas outlet duct and having a slag outlet remote therefrom, the method of burning an ash forming fuel and discharging the products of combustion resulting therefrom comprising the steps of introducing into said annular combustion space in a generally tangential direction streams of fuel and air, burning said fuel thereby producing a stream of rotating combustion gases having molten ash particles suspended therein; separating by centrifugal force a majority of the molten ash particles contained in said rotating combustion gases and causing removal by gravity through said slag outlet of said molten separated ash; applying forces to draw said rotating gases towards and into said axial gas outlet duct in a direction generally opposite to that taken by the said separated molten ash and applying forces opposing the rotation of said gases and traversing the body of said gas stream within said gas outlet duct for converting said rotational motion into a substantially upward straight line motion, whereby the remaining molten ash particles still suspended in the gases follow a substantially straight upward path.

2. In a furnace for burning ash forming fuel and for producing molten ash, a cyclone chamber having an annular combustion space, an axial gas outlet duct extending upwardly from the lower portion of said annular combustion space and in direct communication therewith, fuel burning means for discharging fuel and air tangentially into said annular space, a molten ash outlet in the lower portion of said cyclone chamber and gas flow straightening vanes in said axial gas outlet duct, said vanes extending from an inner peripheral region of said gas outlet duct to a region immediately adjoining the central axis thereof, and said vanes extending vertically within said gas outlet duct a distance approximately at least one half the length of the said duct to form a plurality of gas paths.

3. In a furnace for burning ash forming fuel and for producing molten ash, the combination of a cyclone chamber having an annular combustion space, a radiation chamber arranged above said cyclone chamber, an axial gas outlet duct adjacently extending upwardly from the lower portion of said annular combustion space and communicating with said radiation chamber, fuel burning means for discharging fuel and air tangentially into said annular space, a molten ash outlet in the lower portion of said cyclone chamber and gas flow straightening vanes in said axial gas outlet duct, said vanes extending transversely across the gas flow cross-sectional area of said gas outlet duct, and vertically a distance approximately at least one half of the length of said duct to form a plurality of gas paths.

4. In a furnace, the combination as defined in claim 3, in which said radiation chamber is coaxial with said annular space and said axial gas outlet duct.

5. In a furnace, the combination as defined in claim 3, in which said straightening vanes are arranged radially in said axial gas outlet duct.

6. In a furnace, the combination as defined in claim 3, in which the walls of said annular combustion space and of said axial gas outlet duct are lined with fluid cooled tubes.

7. In a furnace, the combination as defined in claim 3, in which said straightening vanes are arranged near the outlet duct end of said axial gas outlet.

8. In a furnace, the combination as defined in claim 3, in which said straightening vanes are provided with a lower end portion, said end portion being curved in a direction opposite to gas flow to facilitate the flow of gases into the said paths.

References Cited in the file of this patent

UNITED STATES PATENTS 2,739,878    Jolley _____ Mar. 27, 1956

FOREIGN PATENTS 699,139    Great Britain _____ Oct. 28, 1953
701,274    Great Britain _____ Dec. 23, 1953
264,242    Switzerland _____ Jan. 3, 1950